United States Patent [19]

Wilhelm

[11] Patent Number: 4,825,959
[45] Date of Patent: May 2, 1989

[54] FERTILIZER SYSTEM

[76] Inventor: Loray W. Wilhelm, Rte. 1, Box 64, Albert, Kans. 67511

[21] Appl. No.: 120,598

[22] Filed: Nov. 13, 1987

[51] Int. Cl.$^4$ ............................................. A01C 23/02
[52] U.S. Cl. ..................................... 172/720; 111/119
[58] Field of Search .......................... 111/7, 73, 80, 86; 172/193, 720, 724, 730

[56] References Cited

U.S. PATENT DOCUMENTS

| | | | |
|---|---|---|---|
| 3,038,424 | 6/1962 | Johnson | 111/86 X |
| 3,581,685 | 6/1971 | Taylor | 111/7 |
| 3,863,842 | 2/1975 | McFarland et al. | 239/283 |
| 3,895,589 | 7/1975 | Garner et al. | 111/7 |
| 4,108,089 | 8/1978 | van der Lely | 111/7 |
| 4,132,181 | 1/1979 | Smith et al. | 111/7 |
| 4,355,589 | 10/1982 | Wetmore | 111/7 |
| 4,446,801 | 5/1984 | Machnee et al. | 111/86 |
| 4,592,294 | 6/1986 | Dietrich, Sr. et al. | 111/7 |
| 4,616,580 | 10/1986 | Moore et al. | 111/7 |
| 4,628,839 | 12/1986 | Edmisson | 111/7 |
| 4,683,826 | 8/1987 | Solie et al. | 111/7 |

Primary Examiner—Brian S. Steinberger
Attorney, Agent, or Firm—Litman, McMahon, & Brown

[57] ABSTRACT

An improved fertilizer system for use in conjunction with a sweep blade comprises a pipe and a structural channel. The pipe carries liquid fertilizer along each blade and is protected along the blade by the channel. The channel is bolted or otherwise attached to the blade to form a box section in which the pipe is run so that the blade, pipe and channel are rigidly joined. Apertures are drilled through the channel and radially into the pipe at appropriate intervals along the blade to provide a suitable distribution of fertilizer into the soil as the sweep blade moves through the soil.

8 Claims, 1 Drawing Sheet

U.S. Patent
May 2, 1989
4,825,959
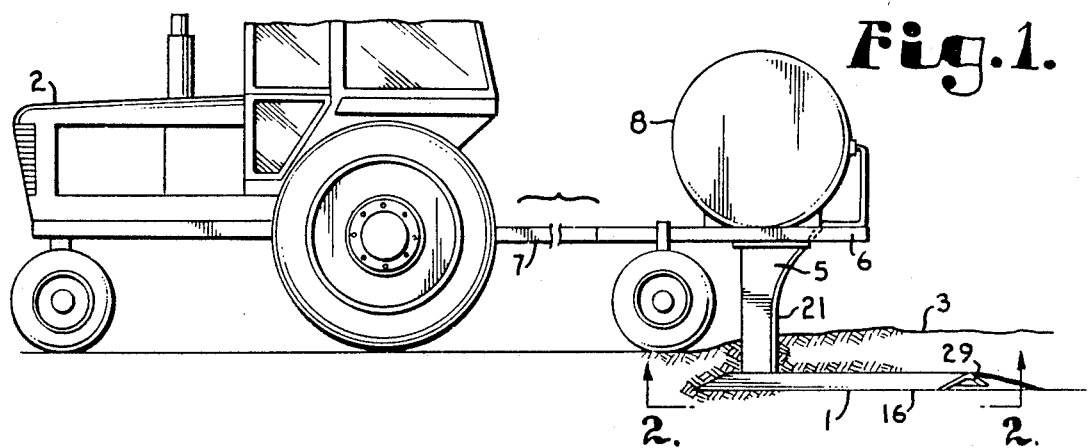
Fig.1.
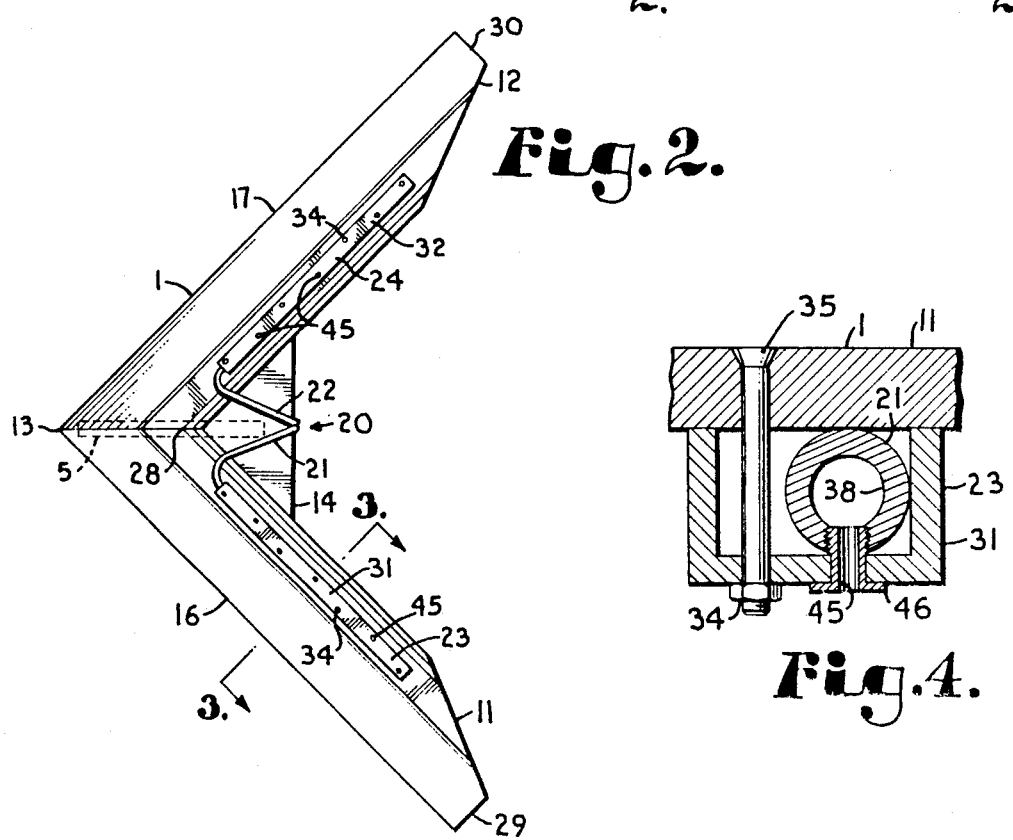
Fig.2.
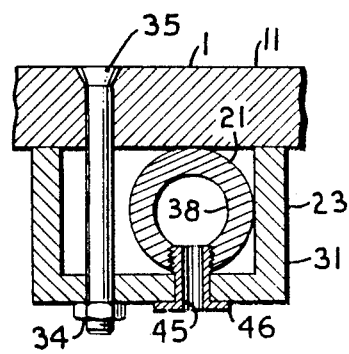
Fig.4.
Fig.3.
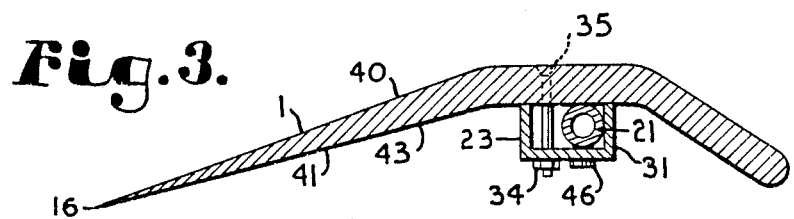

FERTILIZER SYSTEM

BACKGROUND OF THE INVENTION

This invention relates to soil fertilizer systems and, in particular, to the distribution of fluid fertilizer into the soil while passing a sweep blade through the soil to destroy weeds. In this way, two important functions, destroying weeds and fertilizing the soil, are performed in one pass of the fields.

Fertilizer in the form of ammonia or other liquid fertilizer is conveyed to the below-ground sweep blade(s) by piping from a tank mounted on a frame for the blade or in a nurse tank trailing the blade. Unless the below-ground piping is protected, damage to the piping by erosion and abrasion due to being drawn through dirt and rock can result in an undesirable distribution of the fertilizer into the soil.

For many types of conventional distribution piping, the piping is often destroyed by the frictional action of rocks and soil within one day of service or less. In other conventional systems where the piping has had some protection, such systems usually provide for only limited outlets or are expensive and not easily adapted to varying conditions.

SUMMARY OF THE INVENTION

The present invention comprises a structural channel of steel or other suitable material bolted or otherwise attached to the bottom concave surface of a sweep blade so that the sweep blade and the channel form a box section. In each box section is run a pipe for distribution of fertilizer such that the pipe is protected by the channel and the sweep blade. The channel does not provide substantial resistance to the relative flow of soil across the sweep blade because the sectional profile of the blade is such as to provide a hollow in which the channel is placed.

Apertures are drilled through the protective channel radially into the adjacent pipe at appropriate intervals along the blade so as to provide suitable distribution of fertilizer into the soil. The egress of fertilizer from the pipe is thus not limited to the end of the pipe.

OBJECTS OF THE INVENTION

Therefore, the objects of the invention are: to provide a fertilizing system operating with a sweep blade and having a protective means to protect the underground piping from damage as the sweep blade moves through the soil; to provide such a system allowing the location of the distribution openings from the pipe at any suitable point along the blade thereby not limiting openings to the end of each pipe and providing for use of the distribution system with relatively wide blades requiring multiple outlets; and to provide such a system that is relatively easy and inexpensive to manufacture, simple to retrofit to an existing blade and especially well adapted for the intended purpose thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a side elevational view of a tractor and sweep blade including a fertilizer system in accordance with the present invention.

FIG. 2 is an enlarged cross-sectional (bottom plan) view of the sweep blade, showing protected distribution piping of the fertilizer system, taken along line 2—2 of FIG. 1.

FIG. 3 is a cross-sectional view of the sweep blade and fertilizer system, taken along line 3—3 of FIG. 2.

FIG. 4 is an enlarged and fragmentary cross-sectional view of the sweep blade and fertilizer system.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in the disclosed embodiment of the present invention:

In FIG. 1, numeral 1 designates a sweep blade capable of being connected to an agricultural implement, such as the illustrated tractor 2, and which is drawn by the tractor 2 under the surface of the ground 3 to destroy weeds, cultivate and the like.

The blade 1 is connected by a neck 5 to a mobile wheel supported frame 6 which in turn is connected by a hitch 7 to the tractor 2. The frame 6 also supports a fertilizer tank 8, although fertilizer may also be provided by separately drawn and self-supporting trailing nurse tanks. The blade 1 is V-shaped having two wings 11 and 12 and is held by the neck 5 so as to have a nose 13 thereof pointed toward the direction of travel. Each blade wing 11 and 12 has a respective leading edge 16 and 17 which are both generally horizontally aligned when the blade 1 is in use in the ground 3. A triangular shaped strengthening support bracket 14 is secured to each wing 11 and 12 near the rearward juncture thereof. Sweep blades of this type are available from many agricultural implement sources in sizes from a few inches in width to six feet or more and may be used separately or in multiples mounted on suitable frames.

A fertilizer distribution system 20 is provided to be used in conjunction with blade 1. The fertilizer system 20 comprises a pair of elongate distribution pipes 21 and 22 and a respective protective tube, cover or channel 23 and 24 for each pipe. In the illustrated embodiment, the channels 23 and 24, are C-shaped and form a box-like structure with the blade 1. The pipes 21 and 22 are often constructed of somewhat maleable metal, for example copper to allow the pipes 21 and 22 to be easily mounted along the neck 5 and over the bracket 14.

Each pipe 21 and 22 is flow connected at one end thereof to the fertilizer tank 8 for receiving fertilizer, such as liquid ammonia, therefrom. Each pipe 21 and 22 pivotally extends from near a juncture 28 of the wing 11 and 12 to near respective distal ends 29 and 30 thereof. In particular, each pipe 21 and 22 extends from the wing distal end 29 and 30 respectively to near the wing juncture 28, thereafter each pipe 21 and 22 is bent rearwardly and around the support bracket 14 and thereafter extends along the rear of the blade neck 5 after which each pipe 21 and 22 is connected to the tank 8. An adjustable valve may be provided at the tank 8 to vary the pounds of fertilizer applied per acre without changing nozzles. A suitable valve of this type is a model A-3700 nitrolator by John Blue Co.

Each pipe 21 and 22 is fixedly attached to a respective channel 23 and 24 by welding or the like so as to form a protected fertilizer distribution assembly 31 and 32 respectively. Each assembly 31 and 32 is secured by a plurality of bolts 34 and nuts 35 to each respective sweep blade wing 11 and 12.

FIGS. 3 and 4 show a cross-sectional profile of the sweep blade 1 having a cutting edge 16, a top surface 40 and a bottom surface 41. The bottom surface 41 is curved or bowed upwardly to produce a downwardly opening cavity 43 to receive a respective fertilizer assembly 31 such that the assembly 31 is entirely within the cavity 43 and does not present a direct profile to the ground material through which the blade 1 is drawn.

A plurality of apertures 45 are positioned at generally equally spaced locations along each assembly 31 and 32 and extend from the interior of a respective pipe 21 or 22 to the lower surface of a respective protective channel 23 or 24; that is, the apertures 45 pass through both a respective pipe and channel.

The apertures 45 may be formed simply by drilling through the assembly 31 or 32 and this is especially effective when the pipes 20 and 21 are constructed of copper tubing. In the illustrated embodiment, outside threaded and flanged orifices 46 are treaded into drilled clearance holes in respective channels 23 and 24. Apertures 45 are located according to requirement for suitable distribution of fertilizing fluid into the soil. Where the sweep blade 1 is relatively large (for example, five or six feet from tip to tip), the apertures 45 may be aligned with the spacing of crop rows.

The entire pipe/channel assemblies 31 and 32 are mounted underneath the sweep blade 1 so as not to unduly impede the relative movement of the soil past the sweep blade 1 and to reduce the exposure of the assemblies 31 and 32 to erosion by soil and rock. It is foreseen that the apertures 45 may be drilled at an angle relative to vertical. For example, an aperture that slopes forward at the bottom at an angle of about 55° relative to vertical has been found to be highly effective in some soils. It is noted that by distributing the fertilizer under the sweep blade 1 as shown, the fertilizer is distributed over loose, worked soil and then has more loose soil distributed thereto after the blade 1 passes. This acts to effectively distribute the fertilizer in the soil without excessive escape to the atmosphere.

FIG. 4 is a further enlargement showing the pipe 21, interior 38 of the pipe 21, channel 23 and the attachment of channel/pipe assembly 31 to sweep blade 1 using bolt 35 and nut 34.

In use, the blade 1 is drawn through the soil 3 by a tractor 2 or the like. The blade 1 both breaks up the soil above the blade 1 as it passes therethrough and cuts off weeds below the surface of the ground 3. The fertilizer system 20 is activated such that fertilizer is delivered from the tank 8 to the discharge apertures 45 in the assemblies 31 and 32 while the blade 1 is being drawn through the soil 3. The apertures 45 are spread along a substantial portion of the underside of the blade 1 such that the entire path being worked by the blade 1 is effectively fertilized. Such blades may be six feet or more for a single blade and wider for multiple blades. The apertures may have varying diameters in order to assure even flow of fertilizer across the entire path of the blade 1. The pipes 21 and 22 are effectively protected from substantial abrasion and wear by soil and rock by the channels 23 and 24.

The pipe and protective channel assemblies 31 and 32 of the present invention may be retrofitted to blades which were not originally equiped for such assemblies by drilling openings for bolts through the blade or by providing other suitable fastening means such as welding.

Even though the present invention has been shown and described with reference to particular embodiments, various changes and modifications which are obvious to a person skilled in the art, and to which the invention pertains, are deemed to lie within the scope of the invention. For example, the distribution pipe can be fastened to the channel by a special adhesive and orifices can be attached to the channel and pipe by a special adhesive or a press fit.

It is to be understood that while certain forms of the present invention have been illustrated and described herein, it is not to be limited to the specific forms or arrangement of parts described and shown.

What is claimed and desired to be secured by Letters Patent is as follows:

1. A fertilizing distribution system for use in conjunction with a soil working blade; said system comprising:
   (a) a distribution pipe adapted to extend along the length of the blade;
   (b) means to protect said pipe from the soil by a protective structure; said protective structure forming a channel and enveloping said pipe and adapted to cooperate with the blade to substantially entirely encircle said pipe as said pipe extends along said blade;
   (c) means to attach said pipe and said protective structure as a fertilizer assembly to the blade; and
   (d) means to obtain a distribution of fertilizing fluid into the soil at spaced locations along said pipe.

2. In combination with the system of claim 1:
   (a) the blade; said blade having a lower surface; and
   (b) said means to protect said pipe from the soil is a structural box formed by said blade lower surface and said protective structure.

3. The system according to claim 2 wherein:
   (a) said means to attach said pipe and said protective structure to said blade is a plurality of nuts and bolts; said protective structure and said blade having appropriately spaced apertures to receive said bolts.

4. The system according to claim 1 wherein:
   (a) said means to distribute the fertilizing fluid into the soil are a plurality of apertures extending through both said protective structure and said distribution pipe; said apertures being located at spaced locations on said pipe.

5. A fertilizer and soil working apparatus comprising:
   (a) a sweep blade having a pair of wings;
   (b) a pair of fertilizer distribution pipes adapted to be connected to a source of fertilizer; each of said pipes extending substantially along an underside of a respective wing from a juncture of said wings to a distal end of the respective wing;
   (c) each of said pipes having a protective structure positioned in covering relationship to said pipe forming a channel;

(d) fastening means to attach each of said protective structures to a respective wing; and
(e) a plurality of spaced apertures along each of said pipes and protective structures allowing the distribution of fertilizer at spaced locations along the length of said blade through said protective structures.

6. The apparatus according to claim 5 wherein:
(a) each of said protective channels is a C-shaped channel forming a box with said blade underside so as to enclose the section of a respective pipe.

7. The apparatus according to claim 6 wherein:
(a) said apertures are openings drilled through both a respective pipe and a respective channel.

8. The apparatus according to claim 7 wherein:
(a) said fastening means are a plurality of bolts extending through said respective channel and said blade with each of said bolts held in place by a fastener.

* * * * *